United States Patent
Yee

(10) Patent No.: US 7,254,665 B2
(45) Date of Patent: Aug. 7, 2007

(54) METHOD AND SYSTEM FOR REDUCING LATENCY IN TRANSFERRING CAPTURED IMAGE DATA BY UTILIZING BURST TRANSFER AFTER THRESHOLD IS REACHED

(75) Inventor: Dawson L. Yee, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 10/870,778

(22) Filed: Jun. 16, 2004

(65) Prior Publication Data

US 2005/0283544 A1    Dec. 22, 2005

(51) Int. Cl.
- G06F 13/00 (2006.01)
- G09G 5/00 (2006.01)
- G09G 5/08 (2006.01)
- G06K 9/18 (2006.01)

(52) U.S. Cl. .......................... 710/710; 710/5; 345/156; 345/163; 345/173; 345/346; 715/861; 715/863; 715/865

(58) Field of Classification Search .................. 710/5, 710/35; 345/156, 163, 173, 346; 715/861, 715/863, 865, 769

See application file for complete search history.

(56) References Cited

U.S. PATENT DOCUMENTS

| 4,992,650 | A | 2/1991 | Somerville | 235/462 |
|---|---|---|---|---|
| 6,172,676 | B1* | 1/2001 | Wood | 715/769 |
| 6,888,536 | B2* | 5/2005 | Westerman et al. | 345/173 |
| 2005/0179657 | A1* | 8/2005 | Russo et al. | 345/163 |

OTHER PUBLICATIONS

"3.6 Interpolation in Two of More Dimensions." Numerical Recipes in C: The Art of Scientific Computing. Chapter 3. Interpolation and Extrapolation. © 1988-1992, Cambridge University Press. Numerical Recipes Software. pp. 123-128.

"Bar Code 1, 2-Dimensional Bar Code Page." Available http://www.adams1.com/pub/russadam/stack.html. Printed Jan. 20, 2004. 14pp.

Ambiente article. "InteracTable®." Dated Jul. 7, 2000. Available http://www.darmstadt.gmd.de/ambiente/activities/interactable.html. Printed Nov. 21, 2003. 3pp.

(Continued)

Primary Examiner—Tammara Peyton
(74) Attorney, Agent, or Firm—Workman Nydegger

(57) ABSTRACT

Video sensor data are communicated to a memory of a computer system with reduced latency. Upon receiving data from the video sensor, the data are stored until a desired transfer quantity is reached. The transfer quantity is equivalent to a width of a system memory or cache. When the number of data readings detected reaches an integer multiple of the transfer quantity, a bus request is issued. When the request is granted, the data readings are transferred to system memory in a burst mode. Because the transfer quantity is equivalent to a width of a system memory or cache, at least one line of memory or cache is filled during the course of the transfer. Thus, efficient use is made of bus resources. Also, because the processor can access a full line of system memory or cache without waiting for an additional fetch operation, processor resources are used efficiently.

9 Claims, 8 Drawing Sheets

OTHER PUBLICATIONS

Bier, Stone, Pier, Buston, and DeRose. "Toolglass and Magic Lenses: The See-Through Interface." *Proceedings of Siggraph '93* (Anaheim, August). *Computer Graphics Annual Conference Series,* ACM, 1993, pp. 73-80. 8pp.

Blickenstorfer, Conrad H. "First Look: Acer TravelMate TM100 with Windows XP Tablet PC Edition." Pen Computing Magazine. Jul. 2002. pp. 44-47.

"DiamondSpin—Begs for Direct Manipulation Technology Is it the Pen? Sony Leaps Out-of-the-Box Again with Gummi." Mitsubishi/ DiamondSpin. CHI 2004 #3. Printed Apr. 30, 2004. 5pp.

Dietz and Leigh. "DiamondTouch: A Multi-User Touch Technology." *UIST '01* Orlando FLA. © ACM 2001 1-58113-438-x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." *ACM UIST2002 demonstration,* 2002. 2pp.

Grabowski, Robert. "A Miniature Video Laser Range Finder for Small Robots." Available http://www.andrew.cmu.edu/~rig/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions.* New Orleans, LA. Nov. 2002. pp. 1-4.

Horn, Berthold K. P. "Robot Vision." The MIT Press. Available http://mitpress.mit.edu/catalog/item/default.asp?ttype=2 &tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97,* Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99,* May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001,* Seattle. Apr. 2001. pp. 269-270.

Kang, Sing Bing. "Radial Distortion Snakes." *IAPR Workshop on Machine Vision Applications (MVA2000),* Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR '2000,* Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts.* The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001.* 3(2). pp. 1-10.

Kobayashi, Hirano, Narita, and Ishii. "A Tangible Interface for IP Network Simulation." *CHI 2003,* Apr. 5-10, 2003, Ft. Lauderdale, FL ACM 1-58113-630-Jul. 3, 2004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction,* vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference,* Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Undated. 2pp.

Magerkurth, Stenzel, and Prante. "STARS—A Ubiquitous Computing Platform for Computer Augmented Tabletop Games." *5th International Conference on Ubiquitous Computing (Ubicomp '03),* Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Canada. © 1997 ACM 0-89791-881-9/97/10. pp. 209-210.

Missouri Department Of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99.* Asheville, NC. © 1999 ACM 1-58113-075-9/99/11, CHI Letters vol 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002,* Oct. 27-30, 2002. © 2002 ACM. 10pp.

Paradiso, Hsiao, Strickon, Lifton, and Adler. "Sensor systems for interactive surfaces." *IBM Systems Journal,* vol. 39, Nos. 3&4, 2000. pp. 892-914.

Patten, Ishii, Hines, and Pangaro. "Sensetable: A Wireless Object Tracking Platform for Tangible User Interfaces." *Proceedings of CHI 2001,* Mar. 31-Apr. 5, 2001, ACM Press, © 2001 ACM. 8pp.

Patten, Recht, and Ishii. "Audiopad: A Tag-based Interface for Musical Performance." *Proceedings of Conference on New Interface for Musical Expression (NIME '02).* Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000,* 2000. 10pp.

Rekimoto and Matsushita. "Perceptual Surfaces: Towards a Human and Object Sensitive Interactive Display." *Proceedings of Workshop on Perceptural User Interactes (PUI'97),* 1997. 3pp.

Rekimoto and Nagao. "The World through the Computer: Computer Augmented Interaction with Real World Environments." *Proceedings of UIST'95,* 1995. pp. 29-36.

Rekimoto and Saitoh. "Augmented Surfaces: A Spatially Continuous Work Space for Hybrid Computing Environments." *CHI '99,* May 15-20, 1999. Pittsburgh, Pennsylvania. © ACM 1999 0-201-48559-1//99/05. pp. 378-385.

Rekimoto, Jun. "Matrix: A Realtime Object Identification and Registration Method for Augmented Reality." *Proc. of Asia Pacific Computer Human Interaction (APCHI '98),* 1998. 6pp.

Rekimoto, Jun. "Multiple-Computer User Interfaces: 'Beyond the Desktop' Direct Manipulation Environments." *ACI CHI2000 Video Proceedings,* 2000. 2pp.

Rekimoto, Jun. "Pick-and-Drop: A Direct Manipulation Technique for Multiple Computer Environments." *Proceedings of UIST'97,* 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome.com—Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (I3DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar.+Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 ACM 1-58113-702-8/04/0004. 8pp.

SMART Technologies Inc. White Paper. "DViT Digital Vision Touch Technology." Feb. 2003. 10pp.

Smart Technologies, Inc. "Rear Projection SMART Board™ Interactive Whiteboard" "SMART Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-LAND: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York. pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*. ACM Press (CHI Letters 3 (2)), 2001, pp. 11-20 (10pp).

Ullmer and Ishii. "The metaDESK: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. INTERACT 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"VIRTUALBOARD." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

* cited by examiner

METHOD AND SYSTEM FOR REDUCING LATENCY IN TRANSFERRING CAPTURED IMAGE DATA BY UTILIZING BURST TRANSFER AFTER THRESHOLD IS REACHED

FIELD OF THE INVENTION

The present invention generally pertains to processing image data, and more specifically, to communicating image data to a processing system.

BACKGROUND OF THE INVENTION

As personal computers (PCs) have become increasingly more powerful, user expectations of the capabilities of such computers have also grown. Less than three decades ago, most computer displays were limited to one or a few colors, and the resolution was relatively low. At that time, most PCs only had a single input device: a keyboard. As simplistic as that might sound by today's standards, early PCs included keyboard buffers to store keystrokes entered by a user in the event the computer could not process the keystrokes quickly enough to keep up with the single-byte-width stream of data being input from the keyboard. Plainly, latent response to user input has long been a concern in computer design.

Certainly, computer design has changed in countless respects. Some of the more popular early PCs used microprocessors running at a clock speed of 4.77 megahertz and employed an 8-bit-external data bus. However, just over two decades later, a typical PC includes a microprocessor running at a clock speed in excess of 3 GHz and features a 128-bit external data bus. In addition, newer and more powerful peripherals have been developed to take advantage of these ever-increasing processing capabilities. As these faster processors have been coupled to image scanners, PC networking systems, and other high-data-volume input/output devices, contention for PC bus cycles has increased. Faster and wider data bus topologies had to be developed to better keep pace with faster microprocessors and the peripheral devices to which the processors are coupled. Over time, the 16-bit, 8 MHZ Industry Standard Architecture (ISA) bus was supplanted by bus structures such as the 32-bit, 8 MHz Extended Industry Standard Architecture (EISA) topology and the 32-bit, near-processor speed Vesa Local Bus structure. Eventually, the Peripheral Component Interconnect (PCI) bus became standard. Today, a typical computer can include a PCI bus featuring a 32-bit or 64-bit data path operating at speeds of 33 MHz or 66 MHz.

As fast as the PCI bus might be, however, it does not alleviate all system throughput bottlenecks. For example, high-resolution video input devices, displays, and graphics applications can require substantial system resources and require relatively large amounts of data to be conveyed for processing by the central processing unit (CPU). Effective graphics applications involve the high-speed transfer of large quantities of data. Latency in acquiring full-motion video data and/or in generating high resolution graphics can reduce the quality of user interaction with the system, hampering the effectiveness and user enjoyment of the system.

Latency in transferring data to a CPU for processing is particularly relevant to new developments in the human-machine interface. These developments are based on the recognition that it is highly desirable to exploit computer graphics to make computers and their interfaces even more user friendly. For example, the MIT Media Lab, as reported by Brygg Ullmer and Hiroshi Ishii in "The metaDESK: Models and Prototypes for Tangible User Interfaces," *Proceedings of UIST* 10/1997:14-17," has developed another form of "keyboardless" human-machine interface. The metaDESK includes a generally planar graphical surface that not only displays computing system text and graphic output, but also receives user input by responding to an object placed against the graphical surface. The combined object responsive and display capability of the graphical surface of the metaDESK is facilitated using infrared (IR) lamps, an IR camera, a video camera, a video projector, and mirrors disposed beneath the surface of the metaDESK. The mirrors reflect the graphical image projected by the projector onto the underside of the graphical display surface to provide images that are visible to a user from above the graphical display surface. The IR camera used in the vision system of the metaDESK can detect IR reflections from the undersurface of an object placed on the graphical surface.

Others have been developing similar keyboardless interfaces. For example, papers published by Jun Rekimoto of the Sony Computer Science Laboratory, Inc., and associates describe a "HoloWall" and a "HoloTable" that display images on a surface and use IR light to detect objects positioned adjacent to the surface.

These new types of human-machine interfaces are intuitive and easy to use. Nonetheless, from a development standpoint, these interfaces are highly complex. To effectively respond to a movement of a physical object across such an interactive surface, data resulting from reflections of IR sources must be rapidly captured and expeditiously presented to the CPU for processing. If a user drags an object across an interactive display surface and the visual response presented to the user lags noticeably behind the user's actions, the interface may be neither pleasing nor workable. Clearly, in some data-intensive applications, small delays due to latent response may be acceptable. For example, in a simple web-cam application where a camera is coupled to a serial input (for example, to a universal serial bus (USB) port), the input data are captured, digitized, buffered while awaiting serial communications to the system, serialized, transmitted, rebuffered, moved to memory, and, ultimately, processed. The resulting delay may be perfectly acceptable for on-line conferencing and similar uses. On the other hand, such performance lags can be completely unacceptable in user interfaces, like the metaDESK and the HoloWall/HoloTable, which rely on computer vision to sense objects on the display surface.

Capture boards and frame grabbers may help to speed computer vision data transfer, but frame grabbers have disadvantages. Frame grabbers with on-board memory may be effective at receiving data from an imaging device, but having sufficient on-board memory to capture a frame of video data can make such devices expensive. Furthermore, the contents of the on-board memory have to be transferred to system memory for processing. Such transfers of large quantities of data, if not managed effectively, burden system throughput and still result in undesired excessive latency.

Ultimately, it would be desirable to be able to receive input data from a sensor imaging apparatus, such as a video camera, and move the data to system memory quickly and efficiently to both avoid latency and without requiring costly hardware devices.

SUMMARY OF THE INVENTION

One of the advantages of the present invention is that it reduces latency in a computer system's response to sensory input from an imaging device. Sensory input is captured directly, such as from a video sensor array. By not waiting for video data to be serialized or otherwise processed in a conventional manner, much of the latency that would otherwise be incurred in transferring the data through a conventional data port and via the system bus into memory is eliminated.

In addition, the present invention substantially reduces latency without incurring the relatively high cost and/or high overhead of conventional frame-grabber or capture boards. Conventional frame grabber boards capture an entire frame of data, often by storing the frame data in on-board memory. All of that video data must still be transferred over the computer system's bus into memory that is accessible by the CPU for the data to be processed. Transfer of large quantities of data in this manner can impede system performance and will not significantly reduce latency. In contrast, the present invention is attuned toward operational parameters of the computing system with which it is used in order to efficiently transfer data. As a result, the present invention reduces latency caused by inefficient use of computing system resources, including delays arising from buffering, serializing, and deserializing the data. Furthermore, embodiments of the present invention do so without frame grabber boards having large, dedicated on-board memory, thus, are less costly than conventional frame-grabber boards.

More particularly, information detected by a sensor is communicated to a system memory of a computer system over a bus. Data readings are produced by a sensor that is disposed to monitor an area of interest. The data readings are stored, and the data readings generated are tracked as they are stored. When a number of the data readings reaches a transfer quantity, such as a quantity equal to a multiple of a system cache width or a system memory width, access to the bus is requested. Upon access being granted, the transfer quantity of data readings is transferred over the bus to the system memory in a burst mode.

Only a portion of the data readings generated is stored at a time, reducing storage requirements. Moreover, because the data readings are transferred upon reaching a desired transfer quantity that represents one or a multiple of the width of the cache or system memory, full rows of cache or memory can be transferred during the burst transmission, rather than only a part of a row. As a result, a processor can access a full row of data after the burst transmission has occurred without having to wait for relatively lengthy retrieval operations.

In accordance with another aspect of the present invention, the sensor is a sensor array having a plurality of cells each of which is responsive to an input signal. The input signal can include at least one of a visible spectrum light signal, and a non-visible spectrum light signal. Upon detecting the input signal, each cell generates an analog signal representative of a magnitude of the input signal. The analog signals are then converted to digital signals to generate the data readings, where values of the data readings are representative of the magnitudes of the analog signals from the cells. Added to the data readings may be at least one additional signal providing identifying information about a nature of the data readings, such as a timing signal, a vertical synchronization signal, and/or a horizontal synchronization signal, so that the application processing the data readings can specifically determine where in the area of interest each of the data readings corresponds.

According to another aspect of the present invention, the data readings are stored in a storage area having a storage capacity equivalent to one or an integer multiple of the transfer quantity. Thus, transfer of data readings over the system bus is further simplified because transmitting all or part of the storage area transfers a desired, efficient transfer quantity of data readings, in a single burst, as described above. The storage area may include a primary storage area and a secondary storage area. Incoming data readings are directed to the secondary storage area when the primary storage area stores at least one multiple of the transfer quantity of storage bytes. As a result, if the primary storage area is filled or stores the desired number of data readings for a single burst transfer, data readings can continue to be received and stored in the secondary storage area. Thus, while one area is filled or the data readings it contains are being transferred over the bus, data readings can continue to be received in the secondary area.

This invention may be used for transferring data over various types of buses, e.g., a PCI bus or an accelerated graphics port (AGP) bus, both of which provide for rapid, direct memory access to system memory. As a result of the data being efficiently burst mode transferred, latency is substantially reduced.

In one embodiment of the invention, the area of interest includes an integer number of transfer quantities. By using integer numbers for the transfer quantities, bus transfers are not wasted upon retrieval of data to complete the area of interest when the retrieval will net only a fraction of a width of a system memory or cache. Also, a processor interrupt may be generated after a plurality of transfer quantities making up all of an area of interest have been transferred over the bus, signaling to the processor that the data results are all transferred and ready to be processed.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Computing System for Implementing Present Invention

Figure 1:
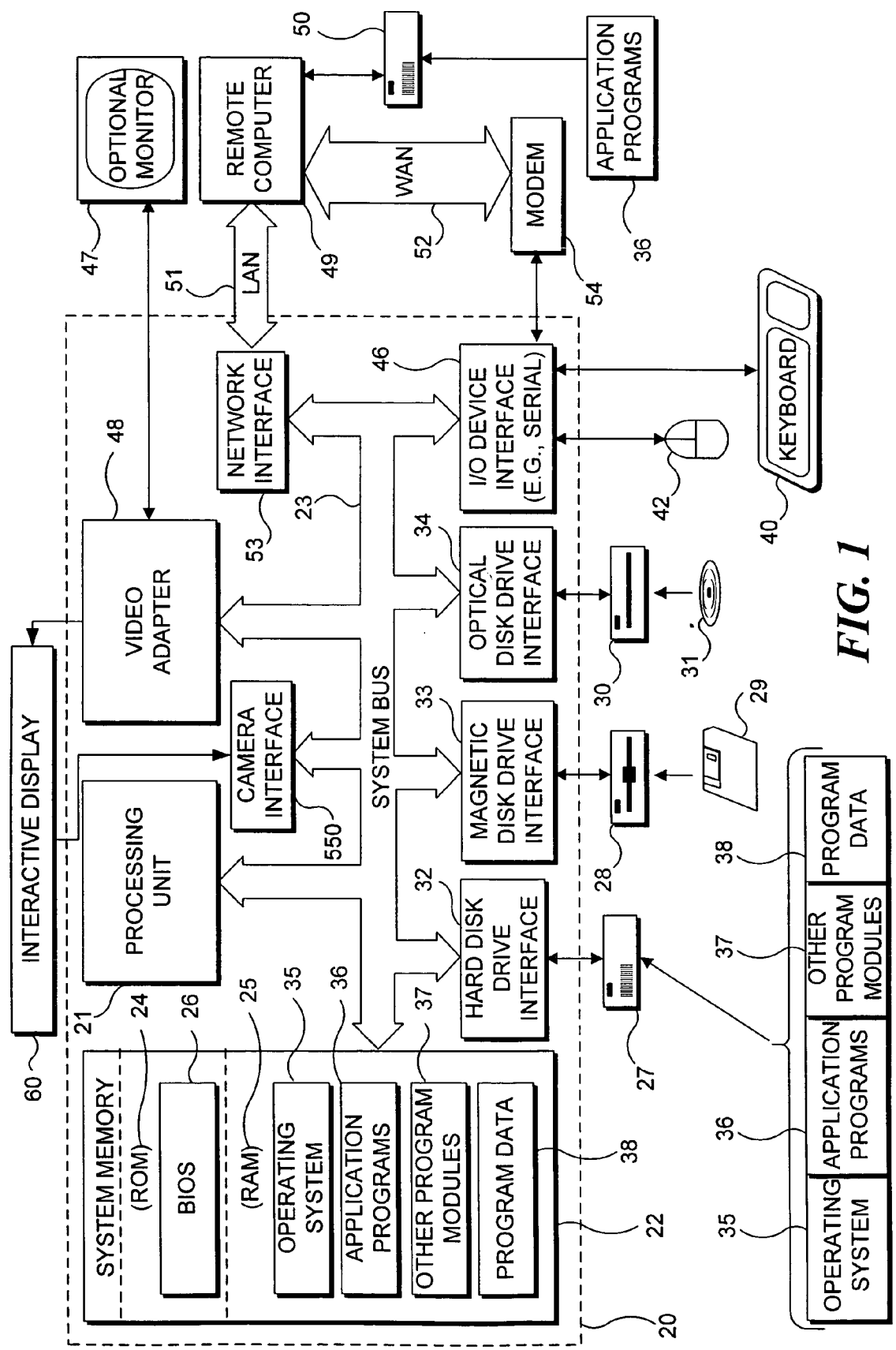
FIG. 1 is a functional block diagram of a generally conventional computing device or PC that is suitable for use with an interactive display surface in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a sensor interface 550, which is coupled to an interactive display 60 to receive signals form a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced on a single machine, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Surface

Figure 2:
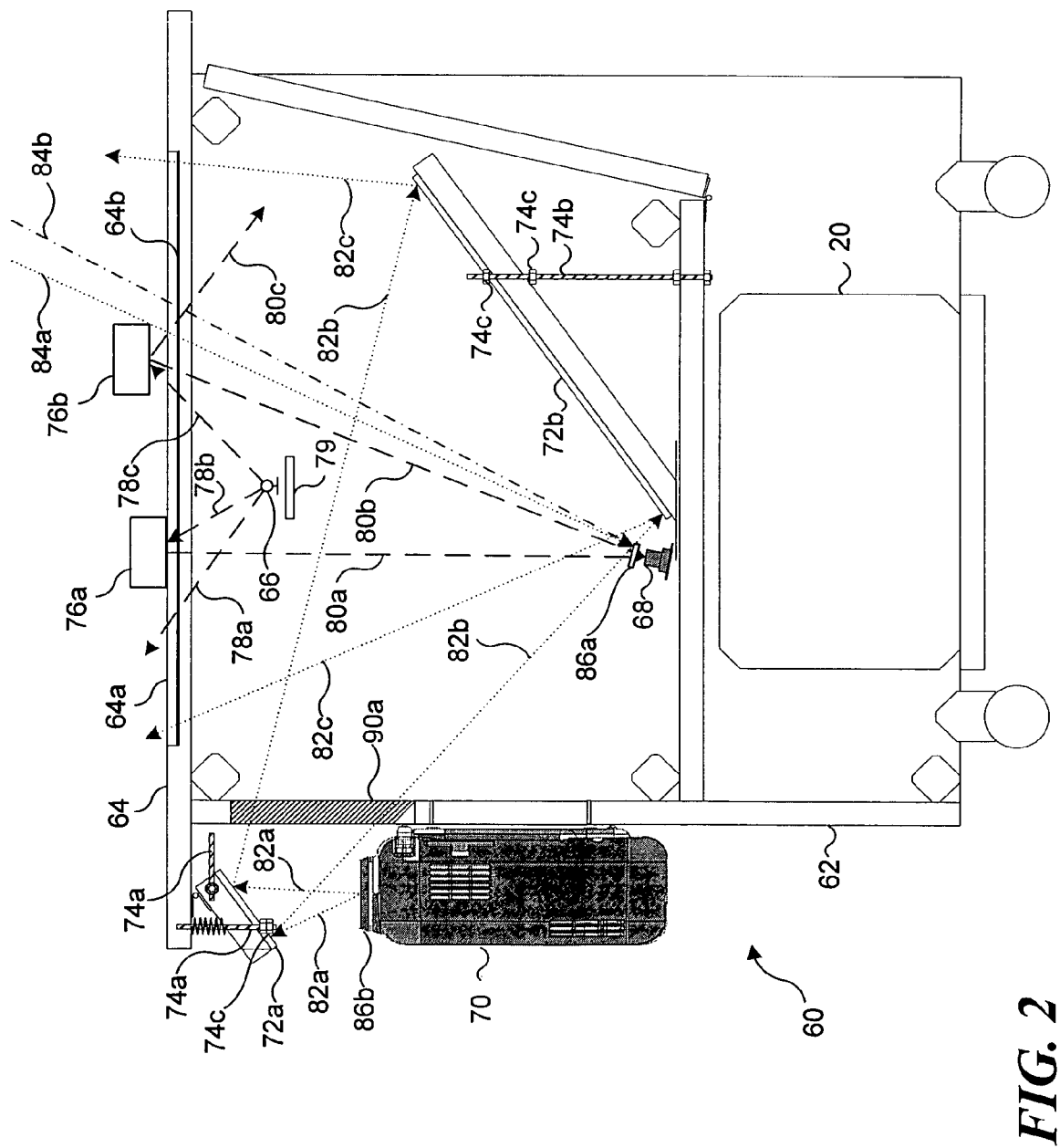
FIG. 2 is a cross-sectional view illustrating internal components of an interactive display surface in the form of an interactive table that includes an integral PC.

In FIG. 2, an exemplary interactive display table 60 is shown that includes PC 20 within a frame 62 and which serves as both an optical input and video display device for the computer. In this cut-away Figure of the interactive display table, rays of light used for displaying text and graphic images are generally illustrated using dotted lines, while rays of infrared (IR) light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64*b* of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64*a*. The infrared light produced by the IR sources may:

- exit through the table surface without illuminating any objects, as indicated by dash line 78*a*;
- illuminate objects on the table surface, as indicated by dash line 78*b*; or
- illuminate objects a short distance above the table surface but not touching the table surface, as indicated by dash line 78*c*.

Objects above display surface 64*a* include a "touch" object 76*a* that rests atop the display surface and a "hover" object 76*b* that is close to but not in actual contact with the display surface. As a result of using translucent layer 64*b* under the display surface to diffuse the IR light passing through the display surface, as an object approaches the top of display surface 64*a*, the amount of IR light that is reflected by the object increases to a maximum level that is achieved when the object is actually in contact with the display surface.

A digital video camera 68 is mounted to frame 62 below display surface 64*a* in a position appropriate to receive IR light that is reflected from any touch object or hover object positioned above display surface 64*a*. Digital video camera 68 is equipped with an IR pass filter 86*a* that transmits only IR light and blocks ambient visible light traveling through display surface 64*a* along dotted line 84*a*. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64*a* and corresponds to an image of IR light reflected from objects on or above the display surface. It will be apparent that digital video camera 68 will also respond to any IR light included in the ambient light that passes through display surface 64*a* from above and into the interior of the interactive display (e.g., ambient IR light that also travels along the path indicated by dotted line 84*a*).

IR light reflected from objects on or above the table surface may be:

- reflected back through translucent layer 64*b*, through IR pass filter 86*a* and into the lens of digital video camera 68, as indicated by dash lines 80*a* and 80*b*; or
- reflected or absorbed by other interior surfaces within the interactive display without entering the lens of digital video camera 68, as indicated by dash line 80*c*.

Translucent layer 64*b* diffuses both incident and reflected IR light. Thus, as explained above, "hover" objects that are closer to display surface 64*a* will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's digit) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, in accord with the present invention. The logical steps implemented to carry out this function are explained below.

Figure 3:
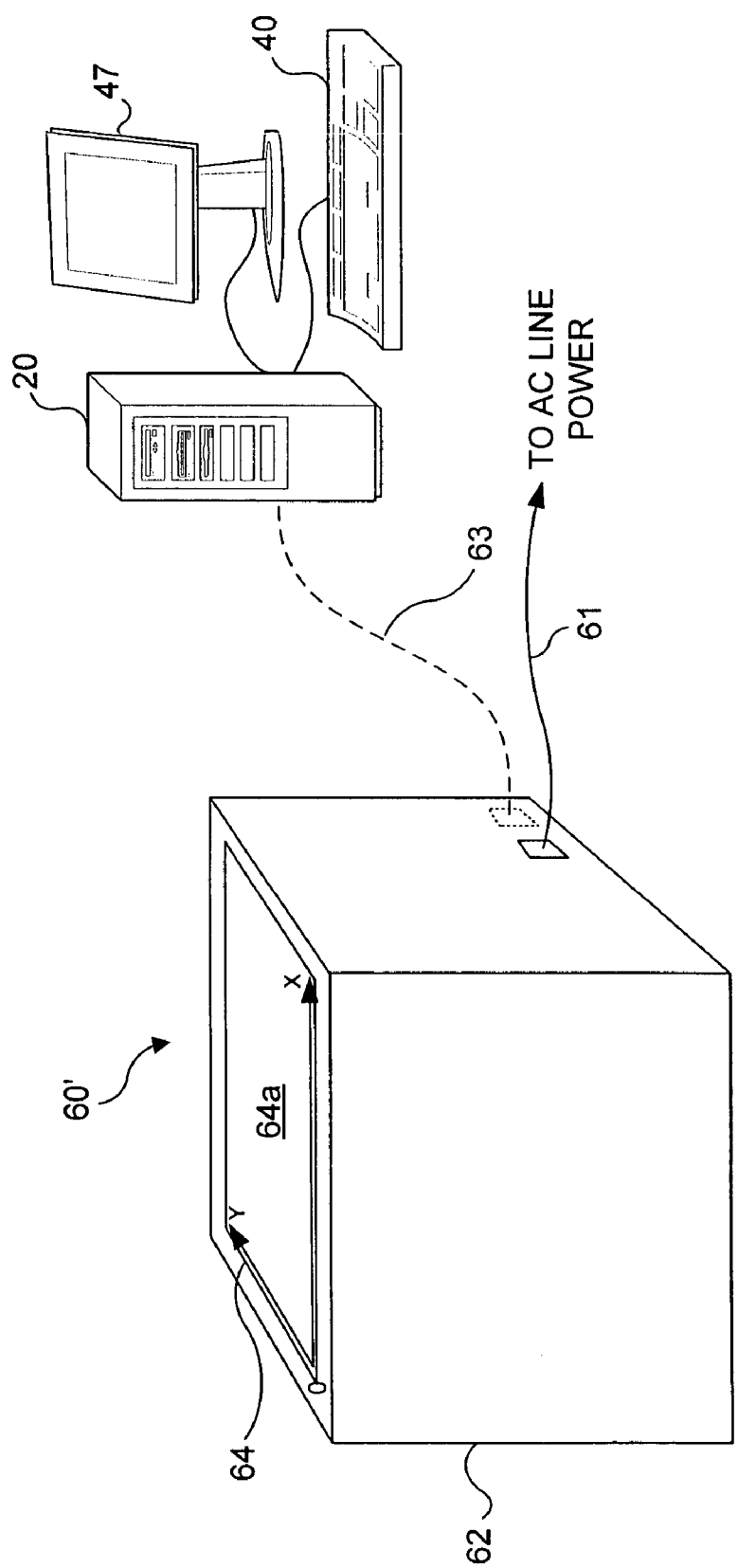
FIG. 3 is an isometric view of an embodiment in which the interactive table is connected to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64*a*, as well as an origin indicated by "0." While not specifically shown, it will be appreciated that a plurality of coordinate locations along each orthogonal axis can be employed to indicate any location on display surface 64*a*.

If the interactive display table is connected to an external PC 20 (as in FIG. 3) or to some other type of external computing device, such as a set top box, video game, laptop computer, or media computer (none shown), then the interactive display table comprises an input/output device. Power for the interactive display table is provided through a power lead 61, which is coupled to a conventional alternating current (AC) line source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of the interactive display table (i.e., of either embodiments discussed above) is its ability to display graphic images or a virtual environment for games or other software applications and to enable an interaction between the graphic image or virtual environment visible on display surface 64*a* and objects that are resting atop the display surface, such as an object 76*a*, or are hovering just above it, such as an object 76*b*. It is the ability of the interactive display table to visually detect such objects, as well as the user's digit or other object being moved by the user that greatly facilities this rich interaction.

Again referring to FIG. 2, interactive display table 60 includes a video projector 70 that is used to display graphic images, a virtual environment, or text information on display surface 64*a*. The video projector is preferably of a liquid crystal display (LCD) or digital light processor (DLP) type, or a liquid crystal on silicon (LCoS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b, and more importantly, helps in achieving a desired size and shape of the interactive display table, so that the interactive display table is not too large and is sized and shaped so as to enable the user to sit comfortably next to it.

The foregoing and following discussions describe an interactive display device in the form of interactive display table 60 and 60'. Nevertheless, it is understood that the interactive display surface need not be in the form of a generally horizontal table top. The principles described in this description of the invention suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the display surface, or otherwise adjacent the display surface.

Issues Concerning Communications between Peripherals and the CPU/System Memory

Figure 4:
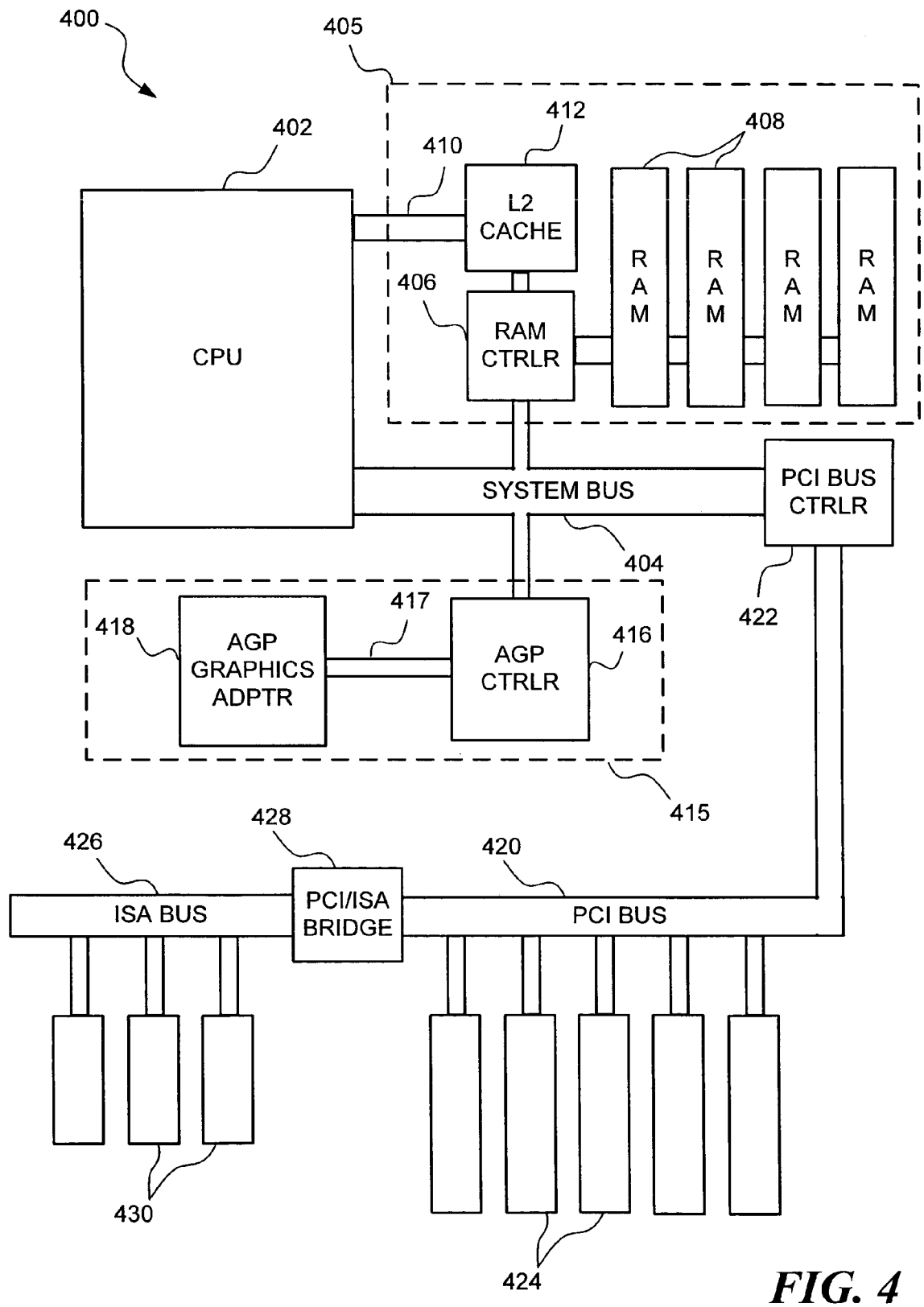
FIG. 4 is a functional block diagram showing further details of a PC having both PCI and AGP buses.

FIG. 4 is a block diagram of an exemplary PC 400 provided with conventional, standard buses for communicating data. PC 400 includes a CPU 402. As will be understood by one of ordinary skill in the art, CPU 402 constantly communicates over a system bus 404 with its memory subsystem 405. The memory subsystem includes a memory controller or RAM controller 406 that interfaces system bus 404 to system memory 408, which includes a plurality of banks of RAM. Memory subsystem 405 also includes a Level 2 (L2) cache 412 to expedite processing. CPU 402 is coupled to L2 cache 412 via a backside bus 410 to facilitate rapid CPU 402 access to data/instructions in the L2 cache. L2 cache 412 is coupled to RAM controller 406 to store data received from system memory 408, to exploit potential reference locality. For example, in a typical PC, CPU 402 may be an Intel™ Pentium 4™ microprocessor, with 256 or 512 KB of L2 cache 412. The 256 KB cache typically has 2,000 rows, each of which is 128 bytes wide, while the 512 KB cache typically has 4,000 rows, each of which also is 128 bytes wide.

Some PCs also include a point-to-point graphics adapter connection, such as an AGP subsystem 415. An AGP controller 416 is coupled with the system bus and, via an AGP bus 417, with an AGP graphics adapter 418. The point-to-point connection provided by the AGP subsystem enables graphics data to be written to memory subsystem 405 where it can be accessed directly by AGP graphics adapter 418 and CPU 402 without the graphics data having to be written to memory in memory subsystem 405 and to memory on AGP graphics adapter 418. Because AGP subsystem 415 interfaces directly with system bus 404, it can potentially impede CPU 402 access to the system bus. Thus, most systems will include, at most, a single AGP adapter 418.

Other peripherals are coupled with system bus 404 via a PCI bus 420 through a PCI bus controller 422. PCI bus 420 enhances system throughput because it facilitates direct memory access between memory subsystem 405 and PCI-attached devices 424, without CPU 402 involvement. Thus, for instance, data can be read from a PCI bus-attached device 424, such as a scanner or storage device, to the memory subsystem 405 while CPU 402 performs other work.

PCI-attached devices 424 typically are limited in number. Because PCI-attached devices have relatively free access to memory subsystem 405, allowing too many PCI-attached devices 424 to be used could impede system throughput. Optionally, other devices, including older or slower devices, can be attached to an ISA bus 426 that is connected to PCI bus 420 through a PCI/ISA bridge 426. Relatively slow devices, such as dial-up modems or other serial devices, may be included as ISA bus-attached devices 430 without impairing the operation of these relatively slow devices or consuming a valuable slot on PCI bus 420.

It will be appreciated that the number of devices interacting with CPU 402 and memory subsystem 405 via PCI bus 424 can potentially impose a significant demand on the PCI bus. Thus, the manner in which PCI bus 420 is used for transmission of graphics information can greatly affect the performance of graphics systems interacting with PCI bus 420. In addition, the manner in which an attached graphics device interacts with PCI bus 420 can either contribute to, or reduce, latency.

Prior to engaging the PCI bus, delays inherent in a peripheral device can also contribute to latency. As described above, using a USB-attached camera coupled to a USB-PCI port, input data must be captured, digitized, buffered, serialized, and transmitted before latency within system 400 caused by PCI bus 420 contention becomes manifest. Reducing latency may therefore involve making both data capture and bus interaction more efficient.

Figure 5:
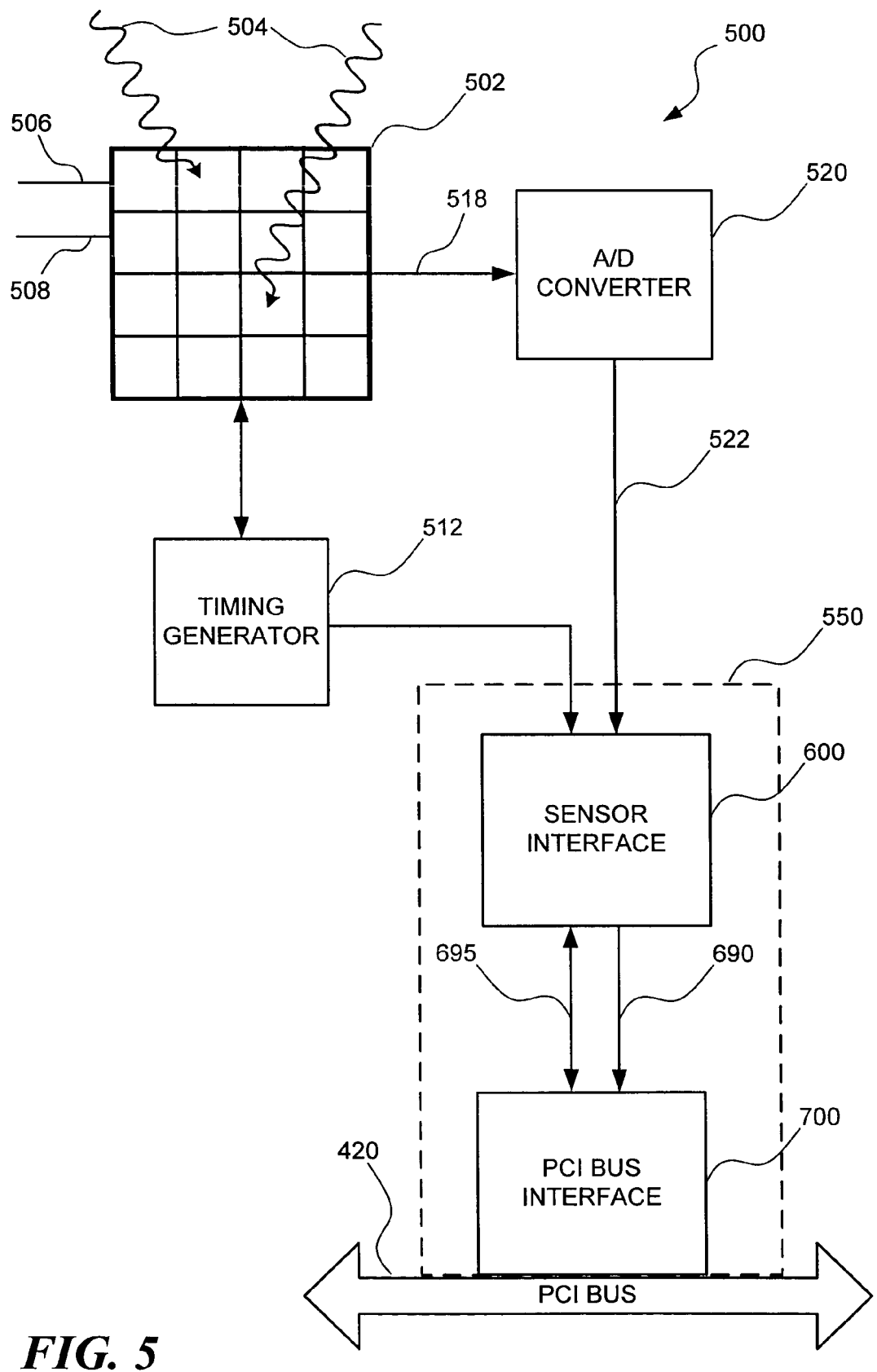
FIG. 5 is a functional block diagram of a sensor array in communication with a sensor interface that is coupled to the PCI bus, in accordance with one embodiment of the present invention.

System for Capturing Sensor Data and Transferring Digitized Signals to System Memory FIG. 5 is a functional block diagram of a system 500 according to an embodiment of the present invention, for reducing latency by making data capture and bus interaction more efficient. In the example of FIG. 5, a sensor array 502 detects and respond to light signals 504 that are incident on it. For example, sensor array 502 might be used in IR video camera 68 (FIG. 2). However, it is not intended that the present invention be limited only for use with a video camera, since it is useful for other types of input sensor devices.

Sensor array 502 comprises a plurality of charge coupled devices (CCDs) or complementary metal oxide semiconductor (CMOS) devices, or other light-responsive devices. Sensor array 502 also includes a vertical synchronization control line 506 and a horizontal synchronization control line 508. A timing generator 512 is in communication with the sensor array 512, as well as with a sensor interface 600, to synchronize the image capture between sensor array 502 and sensor interface 600. Analog output 518 of sensor array 502 is received at an analog-to-digital (A/D) converter 520, where the analog voltage readings of each cell of the sensor array are digitized; the resulting digital output 522 has a value corresponding to a magnitude of the analog voltage reading. In one embodiment of the present invention, the magnitude of the analog reading is represented by an 8-bit byte.

An output 522 of A/D converter 520 is received by a PCI adapter 550. PCI adapter 550 is configured as a PCI-attachable device 424 (FIG. 4), so that it can interface with PCI bus 420 of computing system 400. PCI adapter 550 includes a sensor interface 600 and a PCI bus interface 700, operation of each of which is described below in connection with FIGS. 6 and 7. PCI adapter 550 receives output 522 of A/D converter 520 and ultimately communicates input gathered by sensor array 502 via PCI bus 420 to the memory subsystem 405 (FIG. 4) of the computing system 400. In one embodiment of the present invention, the PCI adapter is a PCI master controller, thereby allowing the PCI adapter to control the PCI bus without intervention of processor 402.

Embodiments of the present invention reduce latency in at least two ways. As previously discussed, one way to reduce latency is to reduce delays associated with data capture. As shown in FIG. 5, sensor interface 600 interfaces directly with A/D converter 520 which, in turn, interfaces directly with sensor array 502. There is no buffering or serializing of output 518 of sensor array 502 before data is received by sensor interface 600, thereby eliminating delays associated with buffering or serializing the data captured. How other delays are avoided is described below in connection with FIG. 6.

Figure 6:
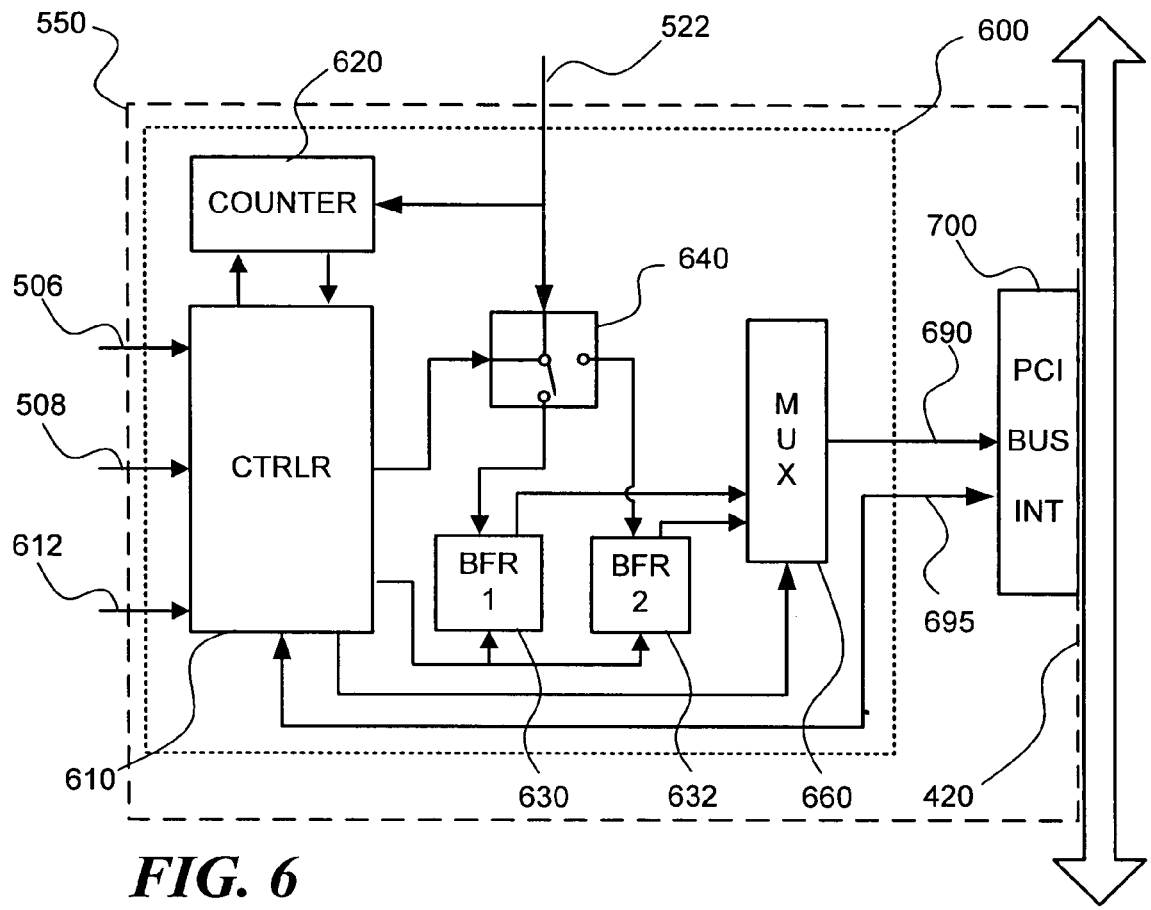
FIG. 6 is a functional block diagram of the sensor interface of FIG. 5.

FIG. 6 illustrates PCI adapter 550 in greater detail and, in particular, includes a functional block diagram of sensor interface 600 in accordance with an embodiment of the present invention. In one embodiment of the present invention, sensor interface 600 includes a controller 610, a counter 620, buffers 630 and 632, a switch 640, and a multiplexer 660. Sensor interface 600, as described in connection with FIG. 5, receives output 522 from A/D converter 520 (FIG. 5). In addition, controller 610 receives vertical synchronization signal 506 and horizontal synchronization signal 508, as well as the signal on a pixel clear line 612. Multiplexer 660 multiplexes the output of buffers 630 and 632. The output of multiplexer 660 thus represents data output 690 of sensor interface 500, which is received at PCI bus interface 700. PCI bus interface 700 also communicates with controller 610 via control line 695.

During the capture of sensor data under the direction of controller 610, counter 620 counts the number of data readings received via output 522. Content of data readings are directed by switch 640, which suitably may be a demultiplexer or other switching device, to one of buffers 630 and 632, where the data readings are stored. Controller 610 is configured to direct data readings to one of buffers 630 and 632 until counter 620 indicates a selected buffer stores an optimal transfer quantity of data readings. In this example, the optimal transfer quantity of data reading is a byte of data. are 8-bit data bytes in this exemplary embodiment reduces latency, as explained below. An optimal transfer quantity, in this exemplary embodiment of the present invention, is 128 bytes. The optimal transfer quantity of 128 bytes corresponds to a cache width of a typical microprocessor, such as an Intel™ Pentium 4™ processor, that may comprise CPU 402 (FIG. 4) in computing system 400. Because this CPU fetches a full line from memory for input into its cache, capturing 128 byte blocks in buffers 630 and 632 ensures that a full cache line of data comprising the data readings will be available for retrieval and input to the cache of the CPU. Also, 128 bytes corresponds to an integer number (i.e., 2) of 32-bit or 64-bit PCI bus transfers to memory. Thus, the transfer quantity is optimized to efficiently use the resources of computing system 400. The transfer quantity can be adjusted to correspond to different cache, system memory, or bus widths to make efficient use of resources in computing systems having caches, system memories, and buses of different sizes, respectively. If desired, the transfer quantity can be set to a multiple of the cache or memory width, i.e., in this example, 256 bytes, 512 bytes, 1024 bytes, etc., thereby respectively causing 2, 4, 8, etc., full cache lines worth of data readings to be transferred at once.

Referring back to FIG. 6, once an optimal transfer quantity of data readings has been counted by counter 620 as having been routed to and stored in one of buffers 630 and 632, controller 610 receives an indication from counter 620 that the desired transfer quantity has been stored. Controller 610 then resets counter 620, directs switch 640 to re-route data readings to the other buffer, and communicates to PCI bus interface 700 that a bus request should be initiated to transfer the contents of the buffer containing a transfer quantity of data readings (that were just burst transmitted thereto). Once that request is granted and received by PCI bus interface 700, controller 610 directs multiplexer 660 and buffers 630 and 632 to transfer the contents of the appropriate buffer to PCI bus interface 700. The contents of the appropriate buffer are then transferred over PCI bus 420 to the memory subsystem 405. This process repeats as long as the capture of the data readings continues.

Other embodiments of the present invention are contemplated. For example, instead of a counter, a status flag generated by buffers 630 and 632 can be employed to indicate when the buffers have received digital readings equal to the transfer quantity and can be used to count the digital readings received. In such a system, the incoming data readings should be latched so that incoming data readings are not lost during the transition between buffers. Also, counter 620 may be configured to count data readings and signal both when a transfer quantity of data readings has been received and when the number of data readings or number of transfer quantities indicate a full frame of data has been received. Alternatively, separate counters can be provided to track receipt of transfer quantities and full frames of data readings. It will be appreciated that, in the example employing a transfer quantity of 128 bytes, five such transfer quantities represent a full line of a 640×480 pixel display, and 2400 such transfer quantities represent an entire frame. The transfer quantity is evenly divisible into the total of data reading represented in lines and the in the full frame, so that processing cycles and time are not wasted on partial memory transfers. In addition, to compensate for greater delays between PCI bus transfers, additional buffers may be included and coupled to PCI bus interface 700 via an appropriate multiplexer.

Figure 7:
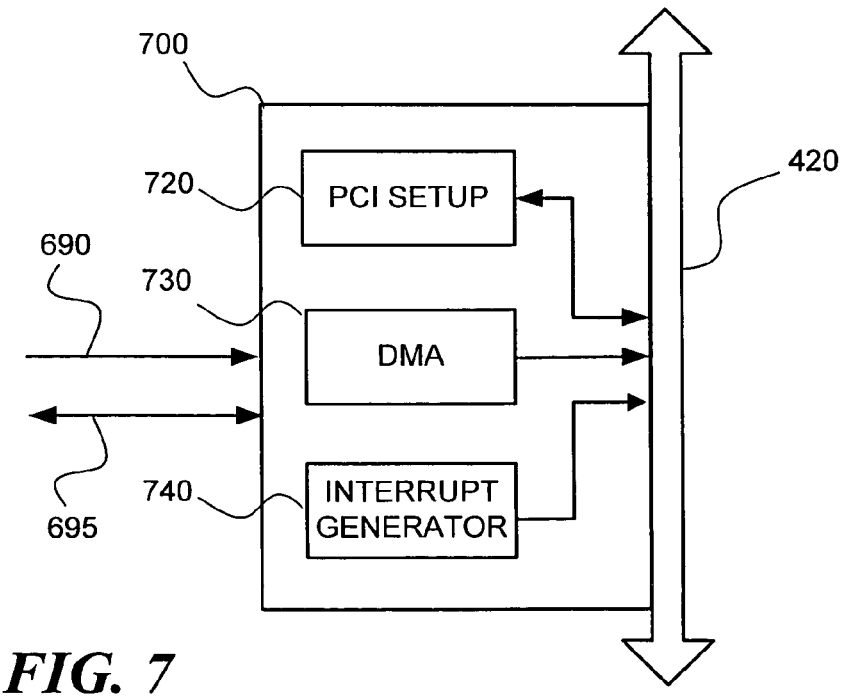
FIG. 7 is a functional block diagram of a PCI bus interface that enables communication over a PCI bus, in accordance with one embodiment of the present invention.

FIG. 7 is a functional block diagram of a PCI bus interface 700. PCI bus interface 700 receives the output of sensor interface 600, including control signals from controller 610 (FIG. 6) and data from buffers 630 and 632 via multiplexer 660. PCI bus interface 700 also receives input from PCI bus 420, such as allowance of bus requests and other commands, and communicates control signals to sensor interface 600 via control line 695.

PCI bus interface 700 is generally conventional in design, and its operation is dictated by PCI bus standards. Because it is standardized, PCI bus interface 700 need not be further described and will be well known to those of ordinary skill in this art. PCI bus interface 700 includes a PCI setup subsystem 720, which comprises configuration and status registers that are used to interface with the rest of the system over PCI bus 420. PCI bus interface 700 also includes a direct memory access subsystem 730. As described above, an advantage of the PCI bus protocol is that it permits devices interconnected with the PCI bus to undertake direct memory access of memory subsystem 405 (FIG. 4) via PCI bus 420 and PCI bus controller 422. Direct memory access subsystem 730 thus manages transfer of output 690 of sensor interface 600 (FIG. 6) to PCI bus 420 according to PCI bus protocols. An interrupt generator 740 responds to input from controller 610 of sensor interface 600 to generate bus requests, also according to the PCI bus protocol.

Although the embodiment of the invention previously described is directed to a PCI bus adapter, other embodiments of the present invention could interface with other buses or interfaces in a computer system. For example, an embodiment of the present invention could be adapted to interface with an AGP bus 417 (FIG. 4). AGP bus 417 and AGP controller 416 provide direct access to memory subsystem 405, bypassing the PCI bus controller. Because AGP interconnection has direct access to system bus 404, only a single AGP connection is typically employed, to avoid system bus 404 contention that may impede processor 402 from accessing system bus 404. AGP connections typically are used for graphics output because generation, processing, and use of graphics is very data intensive. Notwithstanding, AGP bus 417 could be used in an embodiment of the present invention. A variation of the conventional PCI bus (relatively new) with which the present invention can be used is a PCI-Express bus (details not shown). By collecting desired transfer quantities of data readings before transferring them, the present invention minimizes bus usage that could negatively impact processing performance.

Configuration and Operation of PCI Adapter

Figure 8:
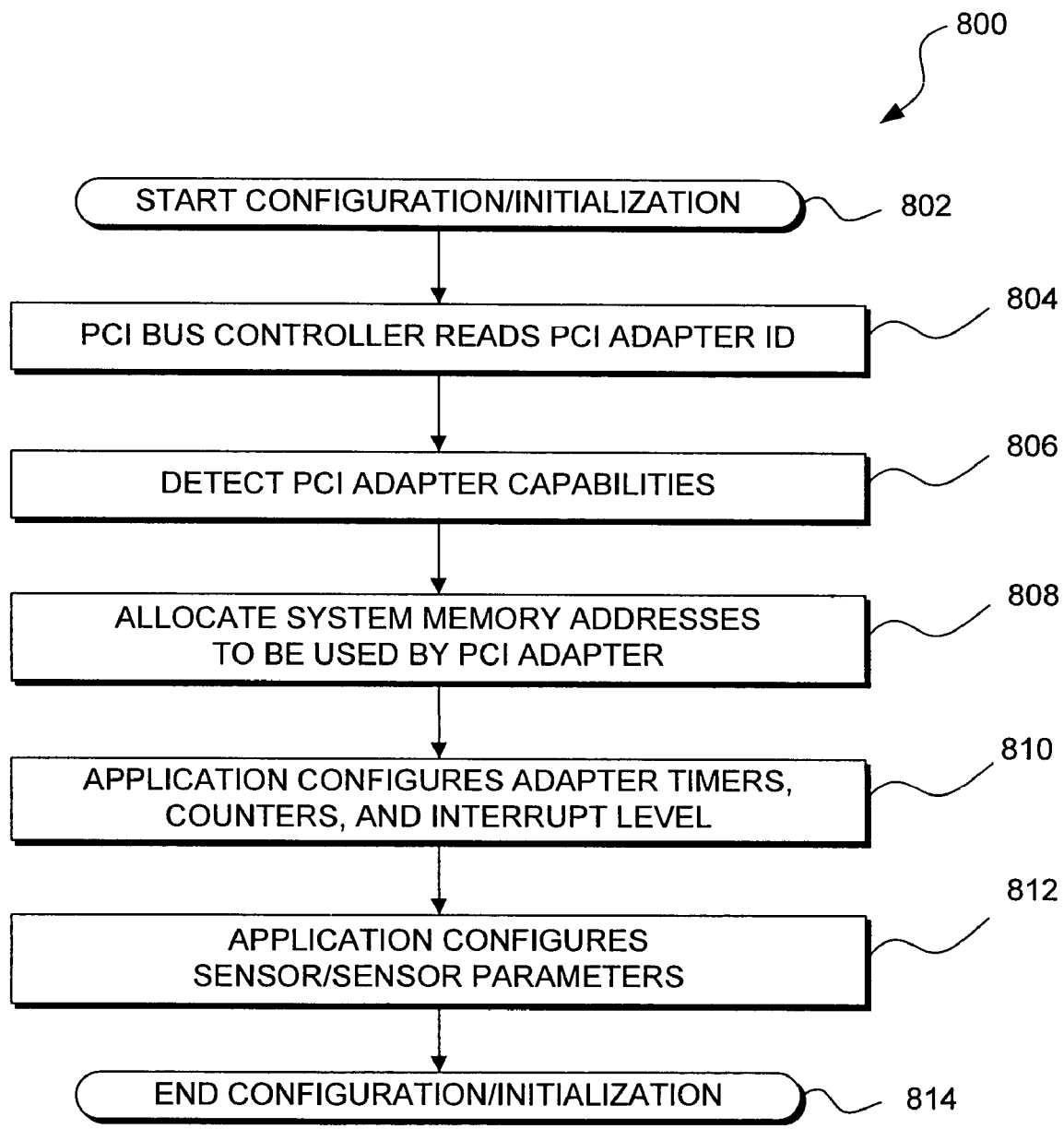
FIG. 8 is a flow diagram illustrating the logical steps for configuring and initializing a sensor interface to communicate over a bus.

In FIG. 8, a flow diagram 800 illustrates the logical steps of configuring and initializing PCI adapter 550 (FIGS. 5 and 6). Flow diagram 800 begins the configuration and initialization of the PCI adapter at a step 802. Configuration and initialization conform to the standard PCI bus protocol and are performed under control of the operating system, as well as by application programs using the PCI adapter.

At a step 804, PCI bus controller reads the PCI adapter ID, and at a step 806, the PCI adapter capabilities are detected. At a step 808, system memory addresses to be used for communications with the PCI adapter are set aside. Those skilled in the art recognize that steps 804-808 are consistent with standard PCI bus protocols used to detect and communicate with PCI-attached devices 424 (FIG. 4).

At a step 810, the application configures adapter times, counters, and interrupt levels. These functions involve use of PCI setup subsystem 720 (FIG. 7). At a step 812, the application configures the sensor and its operational parameters. Configuration/initialization flow diagram 800 ends at a step 814.

Figure 9:
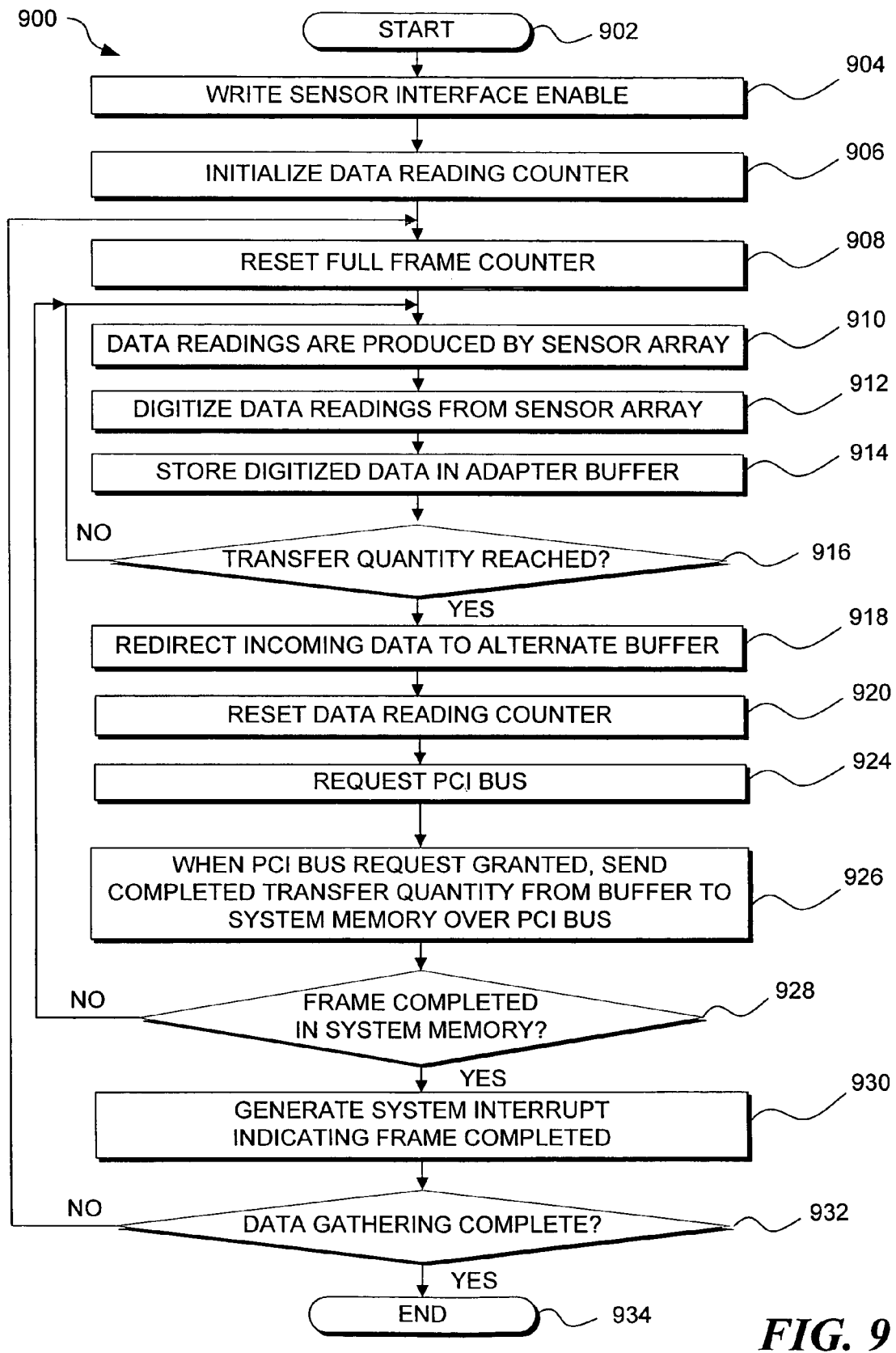
FIG. 9 a flow diagram illustrating the logical steps by which a sensor interface communicates sensor data over a bus to a memory of a computing system, in accord with the present invention.

In FIG. 9, a flow diagram 900 illustrates the logical steps by which the PCI adapter communicates sensor data over PCI bus 420 to memory subsystem 405 of computing system 400 (FIG. 4). As depicted in FIG. 9, it is assumed the PCI adapter has the ability to determine when a transfer quantity of data readings has been received and when a full frame of data has been read. As previously described, tracking to make these determinations may be facilitated by using one or two counters, or by another tracking method.

Flow diagram starts at a step 902. At a step 904, the sensor interface is enabled by a block written by the application program. At a step 906, a data reading counter, used to track when a desired transfer quantity of data readings has been received is initialized. At a step 908, a full frame counter used to track when an entire frame of data readings have been received is reset. At a step 910, data readings are produced by the sensor array. At a step 912, the data readings received from the sensor array are digitized. At a step 914, the digitized data readings are stored in an adapter buffer.

At a decision step 916, it is determined if a number of data readings received and stored in the adapter buffer has reached the desired transfer quantity. If not, flow diagram 900 loops to step 910. On the other hand, if it is determined at decision step 916 that a transfer quantity of data readings has been received and stored in the adapter buffer, at a step 918, incoming data readings are redirected to an alternate adapter buffer so that the collection of the next transfer quantity of data readings can continue while the collected transfer quantity of data readings in the first adapter buffer is transferred over the PCI bus. At a step 920, the data reading counter is reset. At a step 924, a PCI bus request is generated, seeking access to the PCI bus to transfer the transfer quantity of data readings to system memory in a burst transmission. At a step 926, when bus access is granted, the transfer quantity of data readings is sent from the adapter buffer to the system memory over the PCI bus.

At a decision step 928, it is determined whether sending of the most recent transfer quantity has completed transfer of a full frame of data readings into system memory. If not, flow diagram 900 loops to step 910. On the other hand, if it is determined at decision step 928 that a full frame of data readings has been transmitted to the system memory, at a step 930, a system interrupt is generated, indicating that a full frame of data is ready to be processed. It will be appreciated that, using the present invention, it is not necessary for the CPU to wait for transfer of a full frame of data readings to be completed to begin processing; clearly, the CPU can access and process partial frames in accord with the present invention. Also, it should be noted that the PCI adapter need not signal the completion of the full frame. FIG. 9 illustrates only one preferred embodiment of the present invention.

At a decision step 932, it is determined if data gathering is complete. If not, and data gathering continues, flow diagram 900 loops to step 908 where the full frame counter is reset and data gathering continues. On the other hand, if it is determined at the decision step that data gathering is complete, the flow diagram ends at a step 934.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for communicating information to a system memory of a computer system over a bus, the method comprising the steps of:

(a) receiving a plurality of input signals at each of a plurality of cells in a sensor array, the sensor array being positioned to monitor an area of interest;

(b) generating analog output signals for each of the plurality of cells, a magnitudes of each of the analog output signals representing a magnitude of each of the plurality of input signals;
(c) digitizing each of the plurality of analog output signals into a plurality of data readings, a value of each of the plurality of data readings being representative of the magnitude of each of the plurality of analog output signals;
(d) storing the data readings in a storage area;
(e) tracking a number of the data readings stored;
(f) requesting access to the bus when the number of data readings stored reaches a transfer quantity, the transfer quantity being equal to an integer multiple of a system cache width; and
(g) transferring the transfer quantity of data readings over the bus to the system memory in a burst mode upon being granted access to the bus.

2. The method of claim 1, wherein the sensor array comprises an array of sensors responsive to at least one of visible spectrum light signals and non-visible spectrum light signals.

3. The method of claim 1, wherein for each of the data readings, further comprising the step of receiving at least one additional signal, the additional signal providing identifying information about a nature of the data readings.

4. The method of claim 3, wherein the additional signal includes a timing signal indicating an end of a frame.

5. The method of claim 1, wherein the data readings are stored in a storage area comprising a system cache.

6. The method of claim 1, wherein the storage area includes a primary storage area and a secondary storage area, and the data readings are directed to the secondary storage area when the primary storage area stores at least an integer multiple of the transfer quantity of storage bytes.

7. The method of claim 1, wherein the bus is one of a peripheral component interface bus, a peripheral component interface express bus, and an accelerated graphics port bus.

8. The method of claim 1, wherein the transfer quantity is established such that the data readings for the area of interest comprise an integer number of transfer quantities.

9. The method of claim 1, further comprising the step of generating a processor interrupt after transferring a plurality of transfer quantities of data readings such that the plurality of transfer quantities represents a set of data for all of the area of interest.

* * * * *